US008020088B2

(12) United States Patent
Jones (10) Patent No.: US 8,020,088 B2
(45) Date of Patent: Sep. 13, 2011

(54) VISUAL RESPONSIBILITY MATRIX FOR TECHNICAL DESIGNS OR SOLUTIONS

(75) Inventor: Bruce L. Jones, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/626,646

(22) Filed: Jan. 24, 2007

(65) Prior Publication Data

US 2008/0177610 A1    Jul. 24, 2008

(51) Int. Cl.
  *G05B 19/418* (2006.01)
(52) U.S. Cl. .......................................... 715/212; 705/80
(58) Field of Classification Search .................. 715/212, 715/213, 215; 705/8, 10, 9, 80, 7.35, 7.36, 705/7.37
  See application file for complete search history.

(56) References Cited

U.S. PATENT DOCUMENTS

| | | | | |
|---|---|---|---|---|
| 5,093,907 | A * | 3/1992 | Hwong et al. | 345/473 |
| 5,657,460 | A | 8/1997 | Egan et al. | |
| 6,539,403 | B2 | 3/2003 | Cho et al. | |
| 6,684,191 | B1 | 1/2004 | Barnard et al. | |
| 6,766,509 | B1 | 7/2004 | Sheretov et al. | |
| 7,096,082 | B1 * | 8/2006 | Connelly | 700/97 |
| 7,110,957 | B2 | 9/2006 | Barnard et al. | |
| 7,236,976 | B2 * | 6/2007 | Breitenbach et al. | 707/100 |
| 2003/0074329 | A1 * | 4/2003 | Jandasek et al. | 705/80 |
| 2004/0152062 | A1 * | 8/2004 | Adams | 434/336 |
| 2004/0225549 | A1 * | 11/2004 | Parker et al. | 705/8 |
| 2005/0086091 | A1 * | 4/2005 | Trumbly et al. | 705/7 |
| 2005/0288984 | A1 * | 12/2005 | Hamilton | 705/8 |
| 2006/0004648 | A1 * | 1/2006 | Singh et al. | 705/37 |
| 2006/0015527 | A1 * | 1/2006 | Dingle | 707/103 X |
| 2006/0178918 | A1 * | 8/2006 | Mikurak | 705/7 |
| 2006/0218483 | A1 | 9/2006 | Weitzman et al. | |
| 2006/0277084 | A1 | 12/2006 | Barnard et al. | |
| 2010/0235287 | A1 * | 9/2010 | Lymbery et al. | 705/80 |

OTHER PUBLICATIONS

Roles & Responsibilities Matrix for Research Administration, done by http://www.hms.harvard.edu/spa/docs/roles.pdf, Dec. 2002, pp. 1-4.*
"Responsibility Assignment Matrix," Wikipedia free encyclopedia, 2 pages, 2006, Source: http://en.wikipedia.org/wiki/Responsibility_assignment_matrix.
"RACI Diagram," Wikipedia free encyclopedia, 3 pages, 2006, Source: http://en.wikipedia.org/wiki/RACI_diagram.
"Project Management: Responsibility Matrix," Source: http://www.1000ventures.com/business_guide/crosscuttings/project_responsibility_matrix.

* cited by examiner

*Primary Examiner* — Stephen S Hong
*Assistant Examiner* — Ahamed I Nazar
(74) *Attorney, Agent, or Firm* — William Schiesser; Hoffman Warnick LLC (57) ABSTRACT

A visual responsibility matrix is provided that communicates the scope of a technical design or solution used to perform a service. The visual responsibility matrix is a spreadsheet that contains a logical diagram that is representative of components that are in the scope of the technical design or solution. A matrix contains a listing of each of the components that are in the scope of the technical design or solution and a listing of services that are performed for each of the components. The matrix further includes a name of a party in that has the responsibility to perform the service associated with the component. In addition, the matrix provides the costs associated with fulfilling each responsibility.

12 Claims, 6 Drawing Sheets

RESPONSIBILITIES

| SERVICES | Component 1 | Component 2 | Component 3 | Component 4 | Component 5 | Component 6 | Component 7 |
|---|---|---|---|---|---|---|---|
| Service 1 | Client | Client | Client | Client | Client | Client | Client |
| Service 2 | Client | Client | Client | Vendor | Client | Vendor | Client |
| Service 3 | Client | Client | Client | Vendor | Vendor | Vendor | Client |
| Service 4 | Client | Client | Client | Vendor | Vendor | Vendor | Client |
| Service 5 | Client | Client | Client | Client | Client | Client | Client |
| Service 6 | Client | Client | Client | Vendor | Vendor | Vendor | Client |
| Service 7 | Client | Client | Client | Vendor | Vendor | Vendor | Client |
| Reference | 10 | 20 | 30 | 31 | 32 | 40 | 90 |

| SERVICES | Component 1 | Component 2 | Component 3 | Component 4 | Component 5 | Component 6 | Component 7 |
|---|---|---|---|---|---|---|---|
| Service 1 | $ y / mo | $ y / mo | $ y / mo | $ y / mo | $ y / mo | $ y / mo | $ y / mo |
| Service 2 | $ y / mo | $ y / mo | $ y / mo | $x / mo | $x / mo | $x / mo | $ y / mo |
| Service 3 | $ y / mo | $ y / mo | $ y / mo | $x / mo | $x / mo | $x / mo | $ y / mo |
| Service 4 | $ y / mo | $ y / mo | $ y / mo | $x / mo | $x / mo | $x / mo | $ y / mo |
| Service 5 | $ y / mo | $ y / mo | $ y / mo | $ y / mo | $ y / mo | $ y / mo | $ y / mo |
| Service 6 | $ y / mo | $ y / mo | $ y / mo | $x / mo | $x / mo | $x / mo | $ y / mo |
| Service 7 | $ y / mo | $ y / mo | $ y / mo | $x / mo | $x / mo | $x / mo | $ y / mo |
| Reference | 10 | 20 | 30 | 31 | 32 | 40 | 90 |

| SERVICES | MPLS Network | CSU/DSU | WAN Managed Router | Patch Cord | Cisco LAN Switch | Patch Cord | Data Patch Panel / Block | Cross Connect Cable | Data Patch Panel / Block | Cisco LAN Switch | Patch Cord | In House Horiz. or Vert Wiring | Patch Cables |
|---|---|---|---|---|---|---|---|---|---|---|---|---|---|
| Own asset / growth cost | $ y / mo | $ y / mo | $ y / mo | $ y / mo | $ y / mo | $ y / mo | $ y / mo | $ y / mo | $ y / mo | $ y / mo | $ y / mo | $ y / mo | $ y / mo |
| Procurement Initiation | $ y / mo | $ y / mo | $ y / mo | $ | $ y / mo | $ x / mo | $ y / mo | $ x / mo | $ y / mo | $ y / mo | $ x / mo | $ y / mo | $ x / mo |
| Procurement Implementation | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| Maintenance | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| Design & Architecture | $ y / mo | $ y / mo | $ y / mo | $ y / mo | $ y / mo | $ y / mo | $ y / mo | $ y / mo | $ y / mo | $ y / mo | $ y / mo | $ y / mo | $ y / mo |
| Installation (of new devices) | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| Activate/Transition | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| SW Customization (Soft IMACS) | $ y / mo | $ y / mo | $ y / mo | na | $ x / mo | na | na | na | na | $ x / mo | na | na | na |
| Operations | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| Remote Monitoring | $ y / mo | $ y / mo | $ y / mo | na | $ x / mo | na | na | na | na | $ x / mo | na | na | na |
| Input Power/UPS Maintenance | $ y / mo | $ y / mo | $ y / mo | na | $ y / mo | na | na | na | na | $ y / mo | na | na | na |
| Level 1 Support / Help Desk | $ y / mo | $ y / mo | $ y / mo | $ y / mo | $ y / mo | $ y / mo | $ y / mo | $ y / mo | $ y / mo | $ y / mo | $ y / mo | $ y / mo | $ y / mo |
| Level 2 Support Prob. Determination | $ y / mo | $ y / mo | $ y / mo | $ x / mo | $ x / mo | $ x / mo | $ x / mo | $ x / mo | $ x / mo | $ x / mo | $ x / mo | $ x / mo | $ x / mo |
| Level 3 Support | $ y / mo | $ y / mo | $ y / mo | $ x / mo | $ y / mo | $ x / mo | $ y / mo | $ y / mo | $ y / mo | $ y / mo | $ x / mo | $ y / mo | $ x / mo |
| MAC (Hard) | $ y / mo | $ y / mo | $ y / mo | $ x / mo | $ x / mo | $ x / mo | $ y / mo | $ x / mo | $ y / mo | $ x / mo | $ x / mo | $ y / mo | $ x / mo |
| Reference | 10 | 20 | 30 | 31 | 32 | 40 | 90 | 100 | 110 | 32 | 130 | 140 | 150 |

VISUAL RESPONSIBILITY MATRIX FOR TECHNICAL DESIGNS OR SOLUTIONS

BACKGROUND

This disclosure relates generally to complex technical designs or solutions that are often present in transactions such as strategic outsourcing and information technology engagements, and more specifically to providing a visual responsibility matrix that clearly communicates the scope of a technical design or solution for fulfilling a complex technical engagement.

Parties to a complex technical engagement such as a strategic outsourcing engagement or an information technology engagement often have difficulty communicating the scope of the engagement. For example, a customer that has engaged a vendor to perform a technical engagement may not be able to clearly convey to a potential vendor what products and services they are looking for. In a request for a proposal scenario, it is very difficult for a vendor to propose a technical solution if the customer cannot describe what products and services are needed. As a result, a customer will often have to go through several requests for quotes and solution cycles before they can adequately define what products and services are needed to be provided by a vendor. In addition to the problems described for the customer, a vendor may also have trouble describing the demarcation points between the components that are in the scope of the engagement, the services that are to be performed for the components, the party responsible for carrying out the services and the costs associated with each of these services. As a result, the vendor and customer will often have to go through several interactions before there is an understanding between the parties with respect to the scope of the technical solution that is subject to the engagement. Each of the problems that the customer and vendor has with respect to communicating the scope of the technical design or solution for the engagement results in a time consuming, confusing, and expensive process to determine exactly what services the client wishes to purchase from the vendor and at what price.

SUMMARY

In one embodiment, there is a method for generating a visual responsibility matrix that communicates the scope of a technical solution used to perform a service. In this embodiment, the method comprises: providing a spreadsheet; prompting a user to generate a logical diagram on a first portion of the spreadsheet that is representative of components that are in the scope of the technical solution; prompting the user to list each of the components that are in the logical diagram on a second portion of the spreadsheet, wherein the user is prompted to place each of the components in one of a horizontal portion or vertical portion of the matrix; prompting the user to list services that are performed for each of the components in the matrix, wherein the user is prompted to place each of the services in one of the horizontal portion or vertical portion of the matrix separate from the list of components; prompting the user to insert a name of a party that has the responsibility to perform the services associated with the components in the matrix, wherein the user is prompted to enter the name of the party in each cell where the horizontal portion and vertical portion of the matrix intersect; and prompting the user to insert costs associated with fulfilling each responsibility listed in the matrix.

In a second embodiment, there is a computer-readable medium storing computer instructions, which when executed, enables a computer system to generate a visual responsibility matrix that communicates the scope of a technical solution used to perform a service. In this embodiment, the computer instructions comprises: providing a spreadsheet; generating a logical diagram on a first portion of the spreadsheet that is representative of components that are in the scope of the technical solution; listing each of the components from the logical diagram in a matrix on a second portion of the spreadsheet, wherein each of the components is placed in one of a horizontal portion or a vertical portion of the matrix; listing services that are performed for each of the components in the matrix, wherein each of the services is placed in one of the horizontal portion or vertical portion of the matrix separate from the list of components; inserting a name of a party that has the responsibility to perform the services associated with the components in the matrix, wherein the name of the party is placed in each cell where the horizontal portion and vertical portion of the matrix intersect; and providing costs associated with fulfilling each responsibility listed in the matrix.

In a third embodiment, there is a visual responsibility matrix that communicates the scope of a technical solution used to perform a service. In this embodiment, the visual responsibility matrix comprises a spreadsheet and a logical diagram located on a first portion of the spreadsheet that is representative of components that are in the scope of the technical solution. A matrix is located on a second portion of the spreadsheet that contains a listing of each of the components that are in the scope of the technical solution and a listing of services that are performed for each of the components. A vertical column of the matrix is configured to represent each of the components that are in the scope of the technical solution and a horizontal column of the matrix is configured to represent the list of services that are performed for each of the components. Each vertical column of the matrix is configured to represent one component from the list of components and each horizontal row of the matrix is configured to represent one service from the list of services. The matrix further includes a name of a party in each cell of the matrix that has the responsibility to perform the service associated with the component. Each cell provides the costs associated with fulfilling each responsibility listed in the matrix.

In a fourth embodiment, there is a method for deploying a system for generating a visual responsibility matrix that communicates the scope of a technical solution used to perform a service. In this embodiment, the method comprises: providing a computer infrastructure being operable to: provide a spreadsheet; generate a logical diagram on a first portion of the spreadsheet that is representative of components that are in the scope of the technical solution; list each of the components that are in the logical diagram on a second portion of the spreadsheet, wherein each of the components is placed in one of a horizontal portion or vertical portion of the matrix; list services that are performed for each of the components in the matrix, wherein each of the services is placed in one of the horizontal portion or vertical portion of the matrix separate from the list of components; insert a name of a party that has the responsibility to perform the services associated with the components in the matrix, wherein the name of the party is placed in each cell where the horizontal task portion and vertical component portion of the matrix intersect; and providing costs associated with fulfilling each responsibility listed in the matrix.

In a fifth embodiment, there is a data processing system for generating a visual responsibility matrix that communicates the scope of a technical solution used to perform a service. The data processing system of this embodiment comprises: a processing unit; a bus coupled to the processing unit; and a memory medium coupled to the bus comprising program code, which when executed by the processing unit causes the data processing system to: provide a spreadsheet; generate a logical diagram on a first portion of the spreadsheet that is representative of components that are in the scope of the technical solution; list each of the components that are in the logical diagram on a second portion of the spreadsheet, wherein each of the components is placed in one of a horizontal portion or vertical portion of the matrix; list services that are performed for each of the components in the matrix, wherein each of the services is placed in one of the horizontal portion or vertical portion of the matrix separate from the list of components; insert a name of a party that has the responsibility to perform the services associated with the components in the matrix, wherein the name of the party is placed in each cell where the horizontal portion and vertical portion of the matrix intersect; and provide costs associated with fulfilling each responsibility listed in the matrix.

In a sixth embodiment, there is computer software embodied in at least one propagated signal for generating a visual responsibility matrix that communicates the scope of a technical solution used. In this embodiment, the at least one propagated signal comprises instructions for causing at least computer system to: provide a spreadsheet; generate a logical diagram on a first portion of the spreadsheet that is representative of components that are in the scope of the technical solution; list each of the components that are in the logical diagram on a second portion of the spreadsheet, wherein each of the components is placed in one of a horizontal portion or vertical portion of the matrix; list services that are performed for each of the components in the matrix, wherein each of the services is placed in one of the horizontal portion or vertical portion of the matrix separate from the list of components; insert a name of a party that has the responsibility to perform the services associated with the components in the matrix, wherein the name of the party is placed in each cell where the horizontal portion and vertical portion of the matrix intersect; and provide costs associated with fulfilling each responsibility listed in the matrix.

BRIEF DESCRIPTION OF THE DRAWINGS

FIG. 1 shows a schematic of a visual responsibility matrix that communicates the scope of a technical solution that is provided for a complex technical engagement according to one embodiment of this disclosure;

FIG. 3 shows an outline of an example of a visual responsibility matrix used to communicate the scope of a technical solution;

DETAILED DESCRIPTION

FIG. 1 shows a schematic of a visual responsibility matrix 10 that communicates the scope of a technical solution that is provided for a complex technical engagement according to one embodiment. Examples of a complex technical engagement where the visual responsibility matrix 10 is suitable for use is in strategic outsourcing engagements or information technology engagements. Those skilled in the art will recognize that strategic outsourcing engagements or information technology engagements are only examples of some complex technical engagements and that any scenario where a provider of multiple inter-related components or services, wishes to clearly communicate the scope and/or cost of those services to a potential client may be considered a complex technical engagement. A technical solution as used herein means a description of a vendor's services, or a proposal prepared by a vendor in response to a client's request for information, or a response prepared by a vendor in response to a client's request for quotation. Illustrative but non-limiting examples of a technical solution may include Information Technology outsourcing or out-tasking contracts, Wide Area Network (WAN) or Local Area Networking (LAN) technical designs, voice networking, Internet Protocol (IP) Telephony, converged data and voice network designs, Wireless or satellite Communications, Midrange or Mainframe computer processing services, computer hosting services, Internet security designs, firewall or security system designs, software systems, applications development processes, End User Support, Disaster Recovery plans, managed services contracts, business processing consulting, Human Resources Finance & Accounting, Customer Relationship Management, Supply Chain, industrial processing, construction, architectural designs, manufacturing processes, product development systems, and any other services that are used to fulfill the scope of the technical engagement.

As shown in FIG. 1, the visual responsibility matrix 10 comprises a spreadsheet 12 which can be any conventional spreadsheet such as Microsoft Excel. Microsoft, and Excel are trademarks of Microsoft Corporation in the United States, other countries, or both. A logical diagram 14 is located on a first portion of the spreadsheet 12. The logical diagram 14 comprises components (i.e., components 1-7) that are within the scope of the technical solution that is associated with fulfilling the engagement. The logical diagram 14 is shown only in FIG. 1 as a general block diagram for illustration purposes of any type of technical solution that may be provided in an engagement. For example, if the engagement related to an information technology application then the components could represent parts of an information technology solution that a vendor is providing to a client. For instance, if a vendor was developing a data and voice networking system for a client, then the components might embody various items of a data and voice networking system such as switches, cables, routers, cords, etc.

A matrix 16 is located on a second portion of the spreadsheet 12 that contains a listing of each of the components 18 that are in the scope of the technical solution and a listing of tasks or services 20 that are performed for each of the components. In one embodiment, the listing of each of the components 18 is located in the vertical column section of the matrix 16, while the listing of services 20 is located in the horizontal row section of the matrix. As shown in FIG. 1, each vertical column of the matrix 16 is configured to receive one component from the list of components 18 and each horizontal row of the matrix is configured to receive one service from the list of services 20.

The matrix 16 further includes a name of a party that is associated with the engagement in each cell of the matrix that has the responsibility to perform the service associated with the component. For instance, FIG. 1 shows that for component 2, the Client is responsible for performing all seven services associated with this component. For component 5, the Client is responsible for performing services 1, 2, and 5, while the Vendor is responsible for performing services 3, 4, 6, and 7. In one embodiment, each of the cells in the matrix 16 can be shaded or highlighted in a certain color in order to clearly communicate the party that is responsible for performing certain services. FIG. 1 shows shaded cells for instances where the Vendor is the responsible party for performing a service.

In addition to listing the responsible party for completing a service associated with a particular component, each cell lists the costs associated with fulfilling the responsibility. In one embodiment, a user may obtain the costs associated with a cell by double-clicking on the cell. In response to double-clicking on the cell, another spreadsheet that is embedded in the cell will appear in the matrix. This spreadsheet will list the services and components in a manner described above, but instead of having the responsible party listed in the cells that intersect a service for a particular component, the cell will list the expected cost associated with performing the service. As mentioned above, in one embodiment, each of the cost cells in the matrix 16 can be shaded or highlighted in a certain color in order to clearly communicate the party that is responsible for incurring the listed costs. Those skilled in the art will recognize that the matrix 16 may have or be linked to more than one spreadsheet to convey the costs associated with performing services for components. For example, there may be spreadsheets that indicate items such as one-time and recurring costs, fixed or variable costs, customer base-case costs, pre-sales costs, overhead, pricing, transition times between services, delivery cycles of the services, etc.

In one embodiment, additional information can be obtained for each of the components shown in the logical diagram 14 and the matrix 16 For instance, a user can double-click on a component shown in the logical diagram 14 or the columns of the matrix 16. A hyperlink embedded in each item will direct a user to a component information site in response to a selection made by the user. The component information site can have additional information such as make, model, general marketing descriptions, features, functions, benefits, detailed technical descriptions, applications, example scenarios, environmental specifications, electrical consumption, size, weight, heat output, pictures, diagrams, costs, volume discount schedules, applicable taxes, shipping, lead time, delivery and ordering information.

In another embodiment, the matrix 16 can also list additional information that relates to the technical solution in either the horizontal row portion or vertical column portion of the matrix 16. An illustrative but non-limiting listing of additional information that may be provided in the matrix includes assumptions, descriptions and examples that are associated with the technical solution. For example, assumptions could include estimates the vendor had to make due to insufficient information received from the client, timeframes and lead times required, restrictions, exceptions, components or services the client must provide for the vendor in order for the overall solution to be complete, dependencies on certain parties or third parties to perform necessary tasks, descriptions could include the manufacturer, model, version, features, functions, benefits, and the examples could include descriptions of how an item or system is typical used, configured, installed, set up, or handled.

Figure 2:
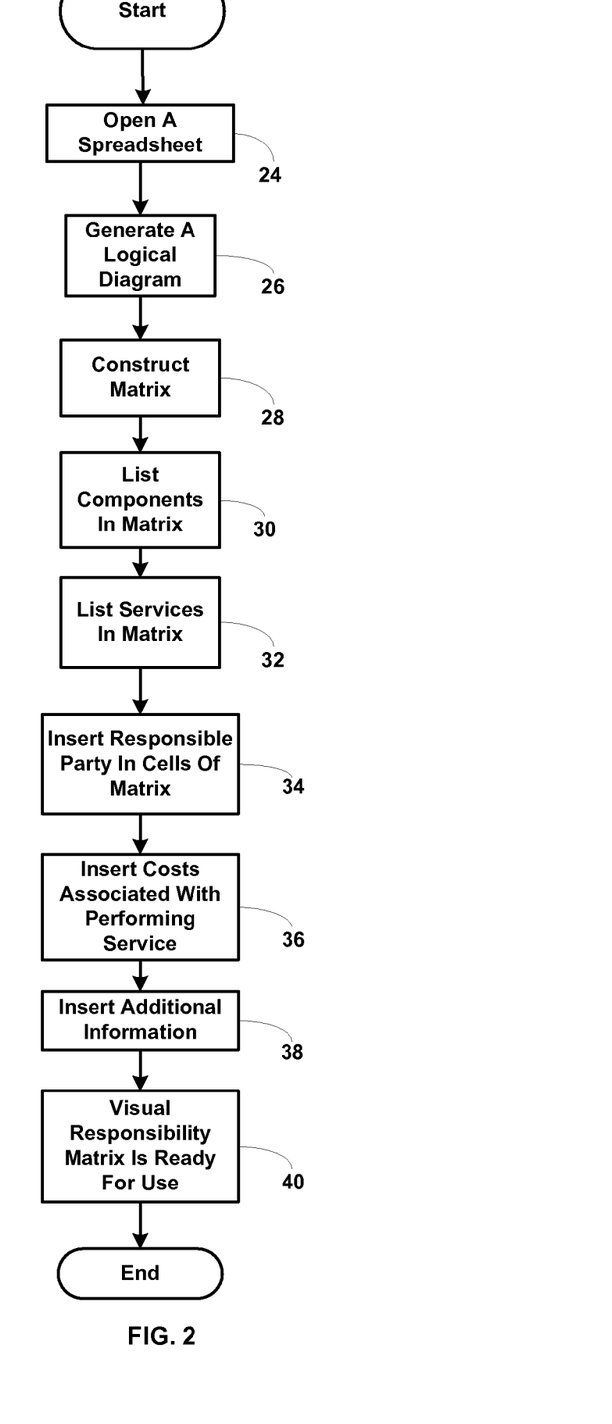
FIG. 2 is a flowchart describing some of the processing functions associated with generating the visual responsibility matrix shown in FIG. 1.

FIG. 2 is a flowchart 22 describing some of the processing functions associated with generating the visual responsibility matrix 10 shown in FIG. 1. The processing functions associated with generating the visual responsibility matrix 10 begin at 24 where the user opens a spreadsheet application. The user then generates a logical diagram on a portion of the spreadsheet at 26. Any type of software application that can generate a diagram can be used to prepare individual components of a logical diagram and paste them into the spreadsheet, one per column. As mentioned above, the components are representative of the items that are within the scope of the technical solution for a particular engagement.

At 28, a matrix is constructed in another portion of the spreadsheet. Each of the components from the logical diagram is listed in the matrix at 30 in the vertical column portion of the matrix. The services that are performed for each of the components are listed in a horizontal row portion of the matrix at 32. Each of the services is placed in one horizontal row in the matrix. A name of a party that has the responsibility to perform the services associated with the components is inserted in each of the cells in the matrix at 34. As mentioned above, the name of the responsible party is placed in each cell where the horizontal row that lists the services, intersects with the vertical column of the matrix that lists the components.

The costs associated with fulfilling each service for a particular component are listed in the matrix at 36. In one embodiment, the costs are embedded in the cell associated with the service and component such that another spreadsheet will appear in the matrix in response to double-clicking on the cell. In another embodiment, the costs are associated with another cell in the spreadsheet. Any additional information such as assumptions, descriptions and examples that is associated with the technical solution is inserted into the matrix at 38. The visual responsibility matrix is then ready to assist parties to fulfill the technical solution associated with the engagement at 40.

In one embodiment, the visual responsibility matrices that are generated in the manner described in FIG. 2 can be used by vendors to speed the development of future technical proposals. For example, each column of component information in the visual responsibility matrix can be thought of as a modular building block of product or service information. If a component is needed in a solution design, the column of information can easily be copied, pasted, and used in a new visual responsibility matrix for other clients. Over time, the more matrices and standardized components the vendor collects, the faster and more consistently new solution matrices can be created. Component column related information can be re-used and refined over and over again from a price and competitiveness standpoint. This modular approach is a feature of the visual responsibility matrix that not only clarifies the scope of current designs, but leads to improved productivity when generating technical proposals and solutions over time.

The foregoing flow chart of FIG. 2 shows some of the processing functions associated with generating a visual responsibility matrix 10 according to this disclosure. In this regard, each block in the flow chart represents a process act associated with performing these functions. It should also be noted that in some alternative implementations, the acts noted in the blocks may occur out of the order noted in the figure or, for example, may be executed substantially concurrently or in the reverse order, depending upon the act involved. Also, one of ordinary skill in the art will recognize that additional blocks that describe these processing acts may be added. For example, if a computer system was configured to automatically generate the visual responsibility matrix, the flow chart would indicate process acts that generate prompts to the user requesting that the user perform items such as generating a logical diagram, developing a matrix and inserting items in the matrix such as the components, services performed for the components and the costs associated with the services and any other additional information that may be necessary to communicate the scope of the technical solution.

Figure 3A:
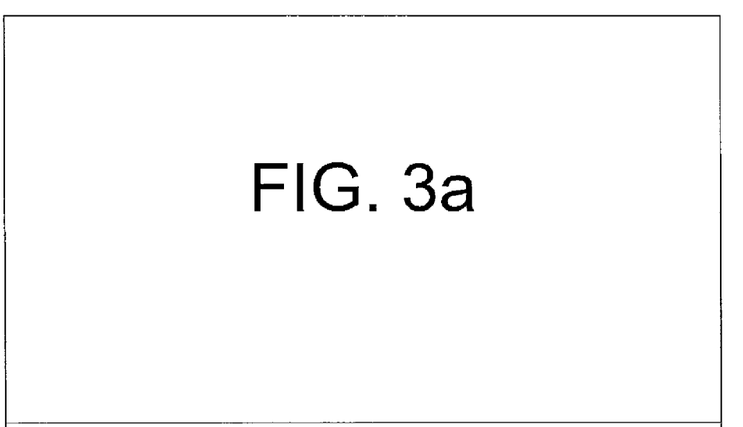
FIGS. 3a-3b show partial detailed views of the visual responsibility matrix shown in outline form in FIG. 3.
Figure 3B:
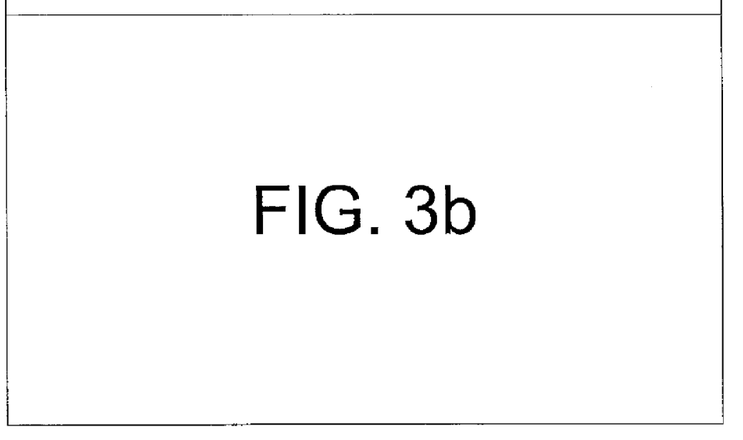

FIG. 3 shows an outline of an example of a visual responsibility matrix used to communicate the scope of a technical solution, while FIGS. 3a-3b show partial detailed views of the visual responsibility matrix. In this example, the engagement relates to a traditional WAN and a data/voice LAN environment and a converged data/voice environment. The scope of the technical solution for the engagement is shown in the visual responsibility matrix of FIGS. 3a-3b. The logical diagram shows some of the components of the technical solution such as a WAN, WAN switch, cross connects, cables, and cords. This solution has been simplified for illustration purposes and those skilled in the art will recognize that a typical technical solution for such an information technology engagement will have many other components.

The example in FIGS. 3a-3b shows that there is a matrix below the logical diagram that lists each of the components in the diagram, the services that are performed for each of the components, the party to the engagement that is responsible for performing the service and the costs associated with performing the service. For instance, for the patch cord component, the client will perform a mixture of services that include design and maintenance, while the vendor will perform services that include the initial procurement and the installation of the patch cord. As shown in FIG. 3a, there are additional services that both the client and vendor will perform. In addition, FIG. 3b indicates the costs associated with performing the services for the components shown in the logical diagram.

As those skilled in the art will recognize the visual responsibility matrix conveys the scope of services to be performed in a clear and easily discernible manner that can be grasped by a wide range of people including top executives down to technical staff. This will help to speed up the process to define, and/or sell and/or implement a complex technical solution. Since the logical diagram components are placed in cells of a spreadsheet, these components can be quickly changed, added, or modified, and linked to other cells of the spreadsheet, or linked to external sources of relevant information. In addition, cost and pricing calculations can be performed quickly in the spreadsheet cells, and responsibilities can be quickly changed. Additional columns of components can easily be inserted or removed, and additional rows of services can also be easily inserted or removed as needed to fit the design.

Figure 4:
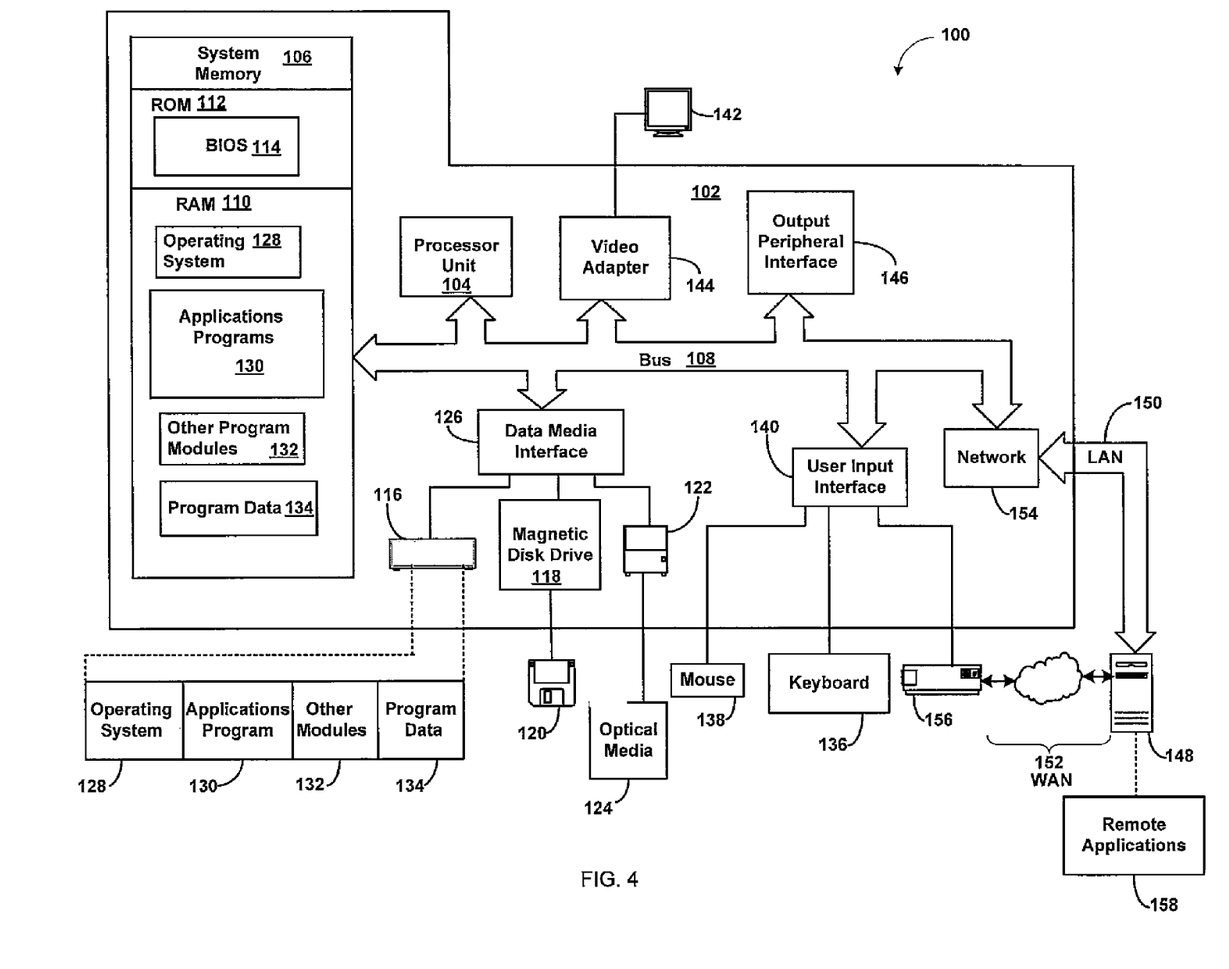
FIG. 4 shows a schematic of an exemplary computing environment which may be used to generate the visual responsibility matrix.

FIG. 4 shows a schematic of an exemplary computing environment which 100 may be used to generate the visual responsibility matrix shown in FIGS. 1 and 3. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 4.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 4, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 4, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 4 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of a spreadsheet application that can be used to generate the visual responsibility matrix.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 4 are a LAN 150 and a WAN 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure, an approach for generating a visual responsibility matrix for technical designs or solutions. While the disclosure has been particularly shown and described in conjunction with a preferred embodiment thereof, it will be appreciated that variations and modifications can be effected by a person of ordinary skill in the art without departing from the scope of the disclosure.

In another embodiment, this disclosure provides a business method that performs the process steps of the disclosure on a subscription, advertising, and/or fee basis. That is, a service provider could offer to generate the visual responsibility matrix. In this case, the service provider can create, deploy, maintain, support, etc., an application that generates the visual responsibility matrix for one or more customers in a technical engagement scenario. In return, the service provider can receive payment from the customer(s) under a subscription and/or fee agreement and/or the service provider can receive payment from the sale of advertising content to one or more third parties.

In still another embodiment, this disclosure provides a method for using an application that generates the visual responsibility matrix within a computer system. In this case, the visual responsibility matrix can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

What is claimed is:

1. A method for generating a visual responsibility matrix that communicates the scope of a technical solution used to perform a service, comprising:

prompting a user to generate a logical diagram on a first portion of a sheet of a spreadsheet that is representative of components that are in the scope of the technical solution;

prompting the user to list each of the components that are in the logical diagram in a first matrix on a second portion of the same sheet of the spreadsheet, wherein the user is prompted to place each of the components in one of a horizontal portion or vertical portion of the first matrix;

prompting the user to list services that are performed for each of the components in the first matrix, wherein the user is prompted to place each of the services in one of the horizontal portion or vertical portion of the first matrix separate from the list of components;

prompting the user to insert a name of a party that has the responsibility to perform the services associated with the components in the first matrix, wherein the user is prompted to enter the name of the party in each cell where the horizontal portion and vertical portion of the first matrix intersect;

for each of the responsibilities listed in the first matrix, prompting the user to input at least one cost associated with fulfilling each responsibility in the first matrix in a second matrix on the second portion that contains the list of each of the components and the list of services in one of a horizontal portion or a vertical portion, wherein the second matrix is separate and distinct from the first matrix, and wherein the second matrix and first matrix are provided on the same sheet of the spreadsheet as the logical diagram;

prompting the user to list additional information that relates to the technical solution, wherein the additional information includes assumptions, descriptions and examples that are associated with the technical solution; and providing additional information about a component in response to the user selecting the component from within the Logical diagram, wherein the providing of additional information comprises linking the user to a component information site in response to selecting the component.

2. The method according to claim 1, wherein the prompting of the user to list each of the components that are in the scope of the technical solution in the first matrix comprises prompting the user to insert the components in a vertical column of the first matrix, wherein each vertical column of the first matrix is configured to receive one component from the list of components.

3. The method according to claim 1, wherein the prompting of the user to list services that are performed for each of the components in the first matrix comprises prompting the user to insert the services in a horizontal row of the first matrix, wherein each horizontal row of the first matrix is configured to receive one service from the list of services.

4. The method according to claim 1, wherein the prompting of the user to input at least one cost associated with fulfilling each responsibility listed in the second matrix comprises prompting the user to insert the costs in each cell that lists the name of a party that has the responsibility to perform the services associated with the components.

5. The method according to claim 4, wherein the inserted costs are linked to other cells in the spreadsheet, or another spreadsheet that is associated with the cell that lists the name of a party that has the responsibility to perform the services associated with the components.

6. A computer-readable storage medium storing computer instructions, which when executed, enables a computer system to generate a visual responsibility matrix that communicates the scope of a technical solution used to perform a service, the computer instructions comprising:

generating a logical diagram on a first portion of a sheet of a spreadsheet that is representative of components that are in the scope of the technical solution;

listing each of the components from the logical diagram in a first matrix on a second portion of the same sheet of the spreadsheet, wherein each of the components is placed in one of a horizontal portion or vertical portion of the first matrix;

listing services that are performed for each of the components in the first matrix, wherein each of the services is placed in one of the horizontal portion or vertical portion of the first matrix separate from the list of components;

inserting a name of a party that has the responsibility to perform the services associated with the components in the first matrix, wherein the name of the party is placed in each cell where the horizontal portion and vertical portion of the first matrix intersect;

for each of the responsibilities listed in the first matrix, inputting at least one cost associated with fulfilling each responsibility in the first matrix in a second matrix on the second portion that contains the list of each of the components and the list of services in one of a horizontal portion or a vertical portion, wherein the second matrix is separate and distinct from the first matrix, and wherein the second matrix and first matrix are provided on the same sheet of the spreadsheet as the logical diagram;

listing additional information that relates to the technical solution, wherein the additional information includes assumptions, descriptions and examples that are associated with the technical solution; and providing additional information about a component in response to the user selecting the component from within the Logical diagram, wherein the providing of additional information comprises linking the user to a component information site in response to selecting the component.

7. The computer-readable storage medium according to claim 6, wherein a vertical column of the first matrix is configured to receive each of the components that are in the scope of the technical solution and a horizontal row of the first matrix is configured to receive the list of services that are performed for each of the components, wherein each vertical column of the first matrix is configured to receive one component from the list of components and each horizontal row of the first matrix is configured to receive one service from the list of services.

8. The computer-readable storage medium according to claim 6, wherein each cell that lists the name of a party that has the responsibility to perform the service associated with the component is configured to receive the inputted costs.

9. The computer-readable storage medium according to claim 8, wherein the inputted costs are linked to other cells in the spreadsheet or another spreadsheet that is associated with the cell that lists the name of a party that has the responsibility to perform the service associated with the component.

10. A computer system, comprising:
at least one processing unit;
memory operably associated with the at least one processing unit;
a visual responsibility matrix generation tool storable in memory and executable by the at least one processing unit that generates a visual responsibility matrix to communicate scope of a technical solution used to perform a service, the visual responsibility matrix comprising:
a spreadsheet;
a logical diagram located on a first portion of a sheet of the spreadsheet that is representative of components that are in the scope of the technical solution;
a first matrix located on a second portion of the same sheet of the spreadsheet that contains a listing of each of the components that are in the scope of the technical solution and a listing of services that are performed for each of the components, wherein a vertical column of the first matrix is configured to represent each of the components that are in the scope of the technical solution and a horizontal row of the first matrix is configured to represent the list of services that are performed for each of the components, wherein each vertical column of the first matrix is configured to represent one component from the list of components and each horizontal row of the first matrix is configured to represent one service from the list of services, wherein the first matrix further includes a name of a party in each cell of the first matrix that has the responsibility to perform the service associated with the component;

a second matrix on the second portion that contains the list of each of the components and the list of services in one of a horizontal portion or a vertical portion, wherein the second matrix is separate and distinct from the first matrix, and wherein the second matrix and first matrix are provided on the same sheet of the spreadsheet as the logical diagram, wherein each cell in the second matrix provides at least one cost associated with fulfilling each responsibility listed in the first matrix;

a listing of additional information that relates to the technical solution, wherein the additional information includes assumptions, descriptions and examples that are associated with the technical solution; and a display of additional information about a component in response to the user selecting the component from within the Logical diagram, wherein the display of additional information comprises a link to a component information site that is retrieved in response to selecting the component.

11. The computer system of claim 10, wherein the costs in the generated visual responsibility matrix are embedded in the cell that lists the name of a party that has the responsibility to perform the service associated with the component.

12. A method for deploying a system for generating a visual responsibility matrix that communicates the scope of a technical solution used to perform a service, comprising:

providing a computer infrastructure being operable to:

generate a logical diagram on a first portion of a sheet of a spreadsheet that is representative of components that are in the scope of the technical solution;

list each of the components that are in the logical diagram in a first matrix on a second portion of the same sheet of the spreadsheet, wherein each of the components is placed in one of a horizontal portion or vertical portion of the first matrix;

list services that are performed for each of the components in the first matrix, wherein each of the services is placed in one of the horizontal portion or vertical portion of the first matrix separate from the list of components;

insert a name of a party that has the responsibility to perform the services associated with the components in the first matrix, wherein the name of the party is placed in each cell where the horizontal portion and vertical portion of the first matrix intersect;

for each of the responsibilities listed in the first matrix, input at least one cost associated with fulfilling each responsibility in the first matrix in a second matrix on the second portion that contains the list of each of the components and the list of services in one of a horizontal portion or a vertical portion, wherein the second matrix is separate and distinct from the first matrix, and wherein the second matrix and first matrix are provided on the same sheet of the spreadsheet as the logical diagram;

list additional information that relates to the technical solution, wherein the additional information includes assumptions, descriptions and examples that are associated with the technical solution; and provide additional information about a component in response to the user selecting the component from within the Logical diagram, wherein the providing of additional information comprises linking the user to a component information site in response to selecting the component.

* * * * *